United States Patent [19]

Bares et al.

[11] Patent Number: 5,005,658
[45] Date of Patent: Apr. 9, 1991

[54] ORTHOGONAL LEGGED WALKING ROBOT

[75] Inventors: John E. Bares; William Whittaker, both of Pittsburgh, Pa.

[73] Assignee: Carnegie-Mellon University, Pittsburgh, Pa.

[21] Appl. No.: 288,677

[22] Filed: Dec. 22, 1988

[51] Int. Cl.$^5$ .............................................. B62D 57/02
[52] U.S. Cl. ..................................... 180/8.1; 180/8.6; 901/1
[58] Field of Search .................. 180/8.1, 8.6, 167, 169, 180/8.3; 901/1

[56] References Cited

U.S. PATENT DOCUMENTS

| | | | |
|---|---|---|---|
| 3,002,578 | 10/1961 | Kraüs ................... | 180/8.1 |
| 4,558,758 | 12/1985 | Littman et al. ........... | 180/8.1 |
| 4,662,465 | 5/1987 | Stewart ................. | 180/8.1 |
| 4,700,427 | 10/1987 | Knepper ............... | 180/169 |
| 4,703,820 | 11/1987 | Reinaud ................ | 180/169 |
| 4,790,400 | 12/1988 | Sheeter ................. | 180/8.1 |
| 4,815,008 | 3/1989 | Kadonoff et al. ........ | 180/169 X |
| 4,834,200 | 5/1989 | Kajita ................... | 180/8.1 |

FOREIGN PATENT DOCUMENTS

| | | | |
|---|---|---|---|
| 1083133 | 6/1960 | Fed. Rep. of Germany ....... | 180/8.6 |
| 2495797 | 6/1982 | France ................. | 180/169 |
| 2595287 | 9/1987 | France ................. | 180/8.1 |
| 104474 | 6/1985 | Japan .................. | 180/8.1 |
| 257375 | 11/1986 | Japan .................. | 180/8.1 |
| 187671 | 8/1987 | Japan .................. | 180/8.1 |
| 251284 | 11/1987 | Japan .................. | 180/8.1 |

OTHER PUBLICATIONS

"ODEX I: The First Functionoid", by Russell, M., *Robotics Age*, Sept./Oct. 1983, vol. 5, No. 5, pp. 12, 14–18.

The Adaptive Suspension Vehicle (ASV) by Waldron, K. J.; Vohnout, V. J.; Pery, A.; McGhee, R. B., "Configuration Design of the Adaptive Suspension Vehicle", *IJRR*, 1984, vol. 3, No. 2, 37–48.

TITAN III by Hirose, S.; Masui, T.; Kikuchi, H.; Fukuda, Y.; Umetani, Y., "Titan III: Quadruped Walking Vehicle", 2nd Int. Symp. of Robotics Research, Aug., 1984, Kyoto, Japan, pp. 325–331.

*Primary Examiner*—Mitchell J. Hill
*Attorney, Agent, or Firm*—Cohen & Grigsby

[57] ABSTRACT

The present invention pertains to a robot for moving along uneven terrain. The robot comprises a body having an exterior surface and a device for defining the terrain around the body. There is also a device for moving the body. The moving device includes legs, at least one of which are capable of being independently positioned adjacent to any portion of the exterior surface of the body. The robot is also comprised of a device for controlling the moving device. The controlling device is connected to the defining device such that the body moves along the terrain in a desired path. In an alternative embodiment, the moving device includes legs, each of which can exhibit an overlapping gait with respect to another leg while moving the body. In a preferred embodiment, each leg is comprised of a shoulder that is rotatable in a angular direction. Each leg is also comprised of a pedestal which has an axis that is disposed in essentially a z direction, where the z direction is perpendicular to the angular direction. There is also a device for linking the shoulder and the pedestal such that the pedestal can be moved in an r direction to a desired r position with respect to the shoulder, where the r direction is perpendicular to the z and the angular directions. The robot moves along the terrain which it defines with the defining device by positioning each leg in a desired place determined by the controlling device and then moving the body forward to reposition itself.

13 Claims, 5 Drawing Sheets

ORTHOGONAL LEGGED WALKING ROBOT

FIELD OF THE INVENTION

The present invention is related to a walking mechanism for robots. More specifically, the present invention is related to a walking mechanism that is capable of an overlapping gait.

BACKGROUND OF THE INVENTION

Robots that travel over terrain must be able to move under their own power to a location where their task is to be performed. Any mobile robot locomotion mechanism must support itself on the terrain and provide a propulsive force for motion. Possible locomotion candidates include mechanisms that roll, walk, or combine rolling and walking for so-called hybrid locomotion. (Track laying mechanisms are grouped here with rolling mechanisms because tracks are in continuous terrain contact and are analogous to large wheels.) The fundamental differences between rolling and walking mechanisms are the means by which support and propulsion are provided. Wheeled machines have rollers in continuous support contact with the terrain and propel themselves by generating traction forces parallel to the terrain surface. Alternately, walkers suspend themselves over the terrain on vertical contact points and maintain principally vertical contact forces throughout propulsion.

Early walking machines coordinated motion mechanically, placing feet or sets of feet in cyclic patterns. Because feet were placed blindly, irrespective of the underlying terrain, cyclic walking machines could not adapt to the terrain. On the other hand, terrain-adaptive walkers have the ability to individually place their feet at desired positions on the terrain. Individual foot placement and leg control allows a walker to optimize stability, follow a desired body trajectory and maximize forward progress even in very difficult terrains. Terrain-adaptive walkers are quite complex machines, typically having 4 or 6 legs and at least 12 degrees-of-freedom. In comparison, industrial robots usually have 4–6 degrees-of-freedom.

The Adaptive Suspension Vehicle (ASV) Waldron, K. J.; Vohnout V. J.; Pery, A.; McGhee, R. B. Configuration design of the adaptive suspension vehicle *IJRR* 1984, vol. 3, no. 2, 37-48, ODEX I Russell, M. *ODEX I: the first functionoid*. Robotics Age Sept./Oct. 1983, vol. 5, no. 5, pp. 12-18, and TITAN III Hirose, S.; Masui, T.; Kikuchi, H.; Fukuda, Y.; Umetani, Y. Titan III: a quadruped walking vehicle. *2nd Int. Symp. of Robotics Research* Aug. 1984, Kyoto, Japan, pp. 247-253 are terrain-adaptive walkers. The legs of each of these walkers are based on pantograph mechanisms. The ASV and ODEX I incorporate legs with two-dimensional pantographs and a third rotary degree of freedom; the Titan III uses three-dimensional pantographs. A variety of "gaits"—leg coordination and control schemes—are used to advance the walkers over terrain. A common gait, the wave gait, advances sets of legs in a wavefront in the direction of travel. Existing terrain-adaptive walkers raise valid concerns regarding the difficulty of planning, energy efficiency and reliability.

Regardless of whether the walking machine is human or computer controlled, the planning required for selecting footholds for many feet can be quite cumbersome. The task of foothold selection is complicated by rugged and difficult terrain conditions. One method that reduces foothold planning is to use precomputed plans that automatically place feet to geometrically satisfy a gait with little or no consideration for the specifics of the underlying terrain. An alternate method to reduce planning uses a follow-the-leader gait in which the computer (or operator) only selects front (leading) feet placements. Trailing feet step next to or in the vacated footprints of leading feet.

The mechanism described herein uses unique overlapping gaits that at least halve the number of footfalls compared to a conventional walker (e.g., ASV) with similarly proportioned legs. In an overlapping gait, a recovering leg can fully or partially pass by a supporting leg without mechanical interference. The result is a large increase in stroke (distance from footfall to foot lift—relative to the body) over conventional walkers and a corresponding significant reduction in the number of footfalls. The wave and follow-the-leader gaits of conventional walkers can require that recovering feet are placed next to leading feet, thus requiring a terrain area large enough to accommodate adjacent footholds for both feet. Since overlapping gaits allow feet to pass by other feet, there is no need to establish a second foothold next to the first thus relaxing the difficulty of walk planning in terrains in which many areas are deemed unacceptable for foot placement. The outcome is a walking mechanism that can succeed in terrains that would frustrate or impede walkers that require more footholds and have the constraint that pairs of footholds be adjacent.

Improving overall energy efficiency is another motivation to reduce footfalls. Footfalls into most natural materials expend irrecoverable energy in the form of terrain deformation, and depending on the type of terrain (e.g., dry sand), a significant amount of energy may be lost. By reducing footfalls, overlapping gaits cut the energy that a walking machine dissipates to the terrain.

Most existing walkers are immobilized or severely impeded after the failure of one or more legs. A unique characteristic of the preferred embodiment of the walking mechanism described herein is that any foot can be placed at any point around the full periphery of the walker body. Therefore, any functional leg can reposition itself to substitute for any failed leg. Though ensuing gaits may have to be modified to account for the reduced number of operational legs, all zones around the body could be covered by operational legs.

SUMMARY OF THE INVENTION

The present invention pertains to a robot for moving along uneven terrain. The robot comprises a body having an exterior surface. There is means for moving the body. The moving means includes legs, at least one of which is capable of being independently positioned adjacent to any portion of the exterior surface of the body. The robot is also comprised of means for controlling the moving means such that the body moves along the terrain in a desired path. In an alternative embodiment, the moving means includes at least 3 legs, any 1 of which can exhibit an overlapping gait with respect to another leg while moving the body. Preferably, there is also means for defining the terrain around the body.

In a preferred embodiment, each leg is comprised of a shoulder that is rotatable in a $\theta$ direction. Each leg is also comprised of a pedestal which has an axis that is disposed in essentially a z direction, where the z direction is perpendicular to the $\theta$ direction. There is also means for linking the shoulder and the pedestal such that the pedestal can be moved in an r direction to a desired r position with respect to the shoulder, where the r direction is perpendicular to the z and the θ directions.

BRIEF DESCRIPTION OF THE DRAWINGS

In the accompanying drawings, the preferred embodiments of the invention and preferred methods of practicing the invention are illustrated in which.

DESCRIPTION OF THE PREFERRED EMBODIMENT

Figure 1:
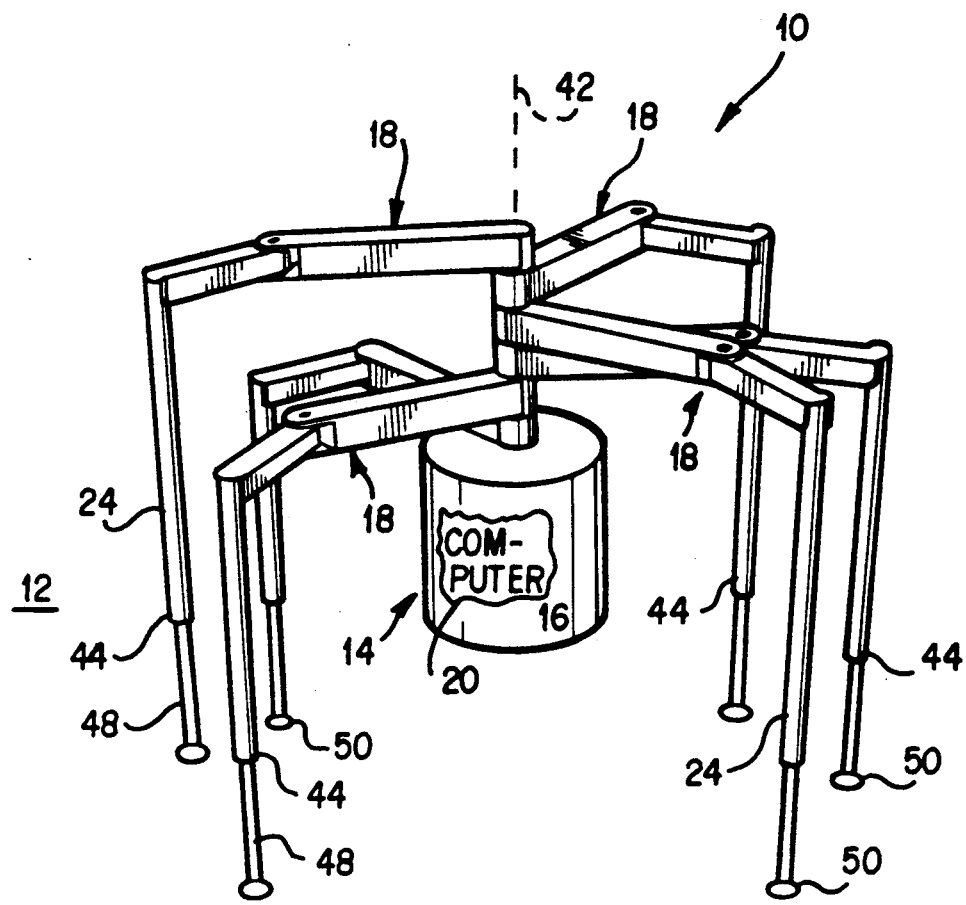
FIG. 1 is a perspective view of the robot.
Figure 2:
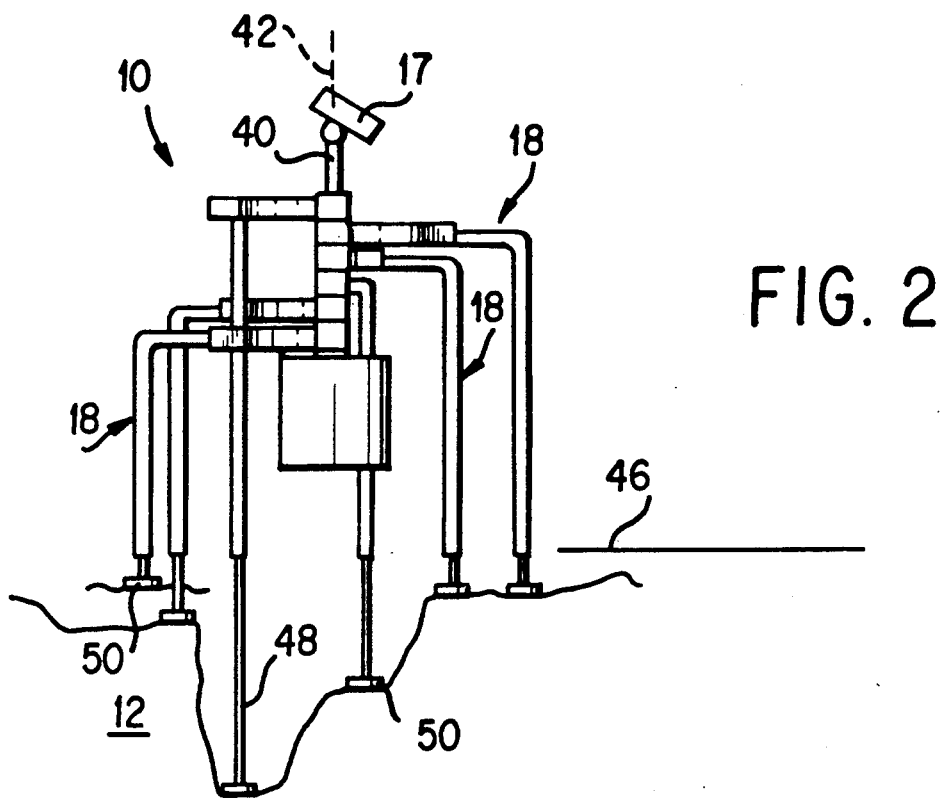
FIG. 2 is a side view of the robot.

Referring to the drawings wherein like reference numerals refer to similar or identical parts throughout the several views, and more specifically to FIG. 1 thereof, there is shown a perspective view of a robot 10 for moving along uneven terrain 12. The robot 10 is comprised of a body 14 having an exterior surface 16. The robot 10 is also preferably comprised of means for defining the terrain 12 around the body 14, such as a laser range finder 17, as shown in FIG. 2, and means for moving the body 14. The moving means includes legs 18, each of which are capable of being independently positioned adjacent any portion of the exterior surface 16 of the body 14. The robot 10 is also comprised of means for controlling the moving means such as a computer 20. The computer is connected to the laser range sensor 17 such that the body 14 moves along the terrain 12 in a desired path. The capability of each leg 18 being independently positioned adjacent any portion of the exterior surface 16 of the body 14 allows each of the legs 18 to exhibit an overlapping gait with respect to another leg 18.

Figure 3:
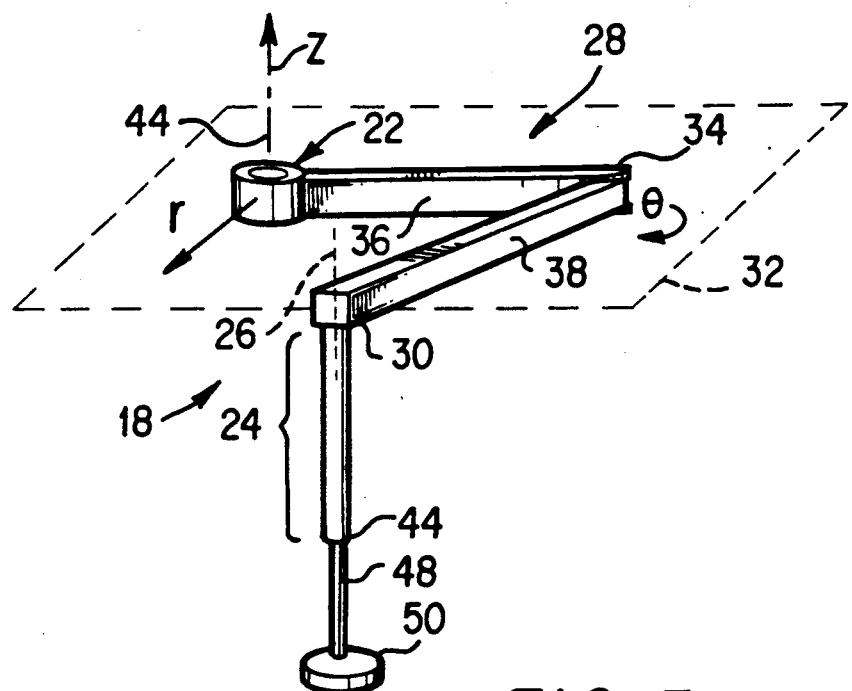
FIG. 3 is a perspective view of a leg.

Each leg 18 is preferably comprised of a shoulder 22, as shown in FIG. 3, that is rotatable in a θ direction. There is also a pedestal 24 which has an axis 26 that is disposed essentially in a z direction, where the z direction is perpendicular to the θ direction. There is also means 28 for linking the shoulder 22 and the pedestal 24 such that the pedestal 24 can be moved in an r direction to a desired r position with respect to the shoulder 22, where the r direction is perpendicular to the z and the θ directions. Preferably, the linking means 28 is linked to the pedestal 24 at a position 30 which is essentially maintained at the same z elevation as the shoulder 22.

The linking means 28 and the shoulder 22 define a plane 32 in the r and θ directions, and the linking means 28 preferably includes an elbow 34. The elbow 34 is disposed between and connected to the shoulder 22 and the pedestal 24 such that the elbow 34 is maintained in the r, θ plane. The elbow 34 is rotatable in the θ direction.

The linking means 28 also preferably includes a first linkage 36 disposed between and connected to the shoulder 22 and the elbow 34 such that when the shoulder 22 rotates in the θ direction, the first linkage 36 and the elbow 34 sweep a corresponding arc length in the r, θ plane. The linking means 28 additionally preferably includes a second linkage 38 disposed between and connected to the elbow 34 and the pedestal 24 such that when the elbow 34 rotates in the θ direction, the second linkage 38 and the pedestal 24 sweep a corresponding arc length in the r, θ plane 32.

The body 14 of the robot 10 preferably also includes a member 40 having an axis 42. The member 40 extends upwards such that the axis 42 of the member 40 is essentially in the z direction. Each shoulder 22 has an axis 44, and each axis 44 of each shoulder 22 of each leg 18 is disposed on the axis 42 of the member 40. The shoulders 22 are stacked on top of each other along the member 40. Each of the pedestals 24 preferably have a length that corresponds to the height of each pedestal's 24 respective shoulder 22 stacked on the member 40 such that all the pedestals 24 have a bottom 44 that together form a second r, θ plane 46.

Figure 4:
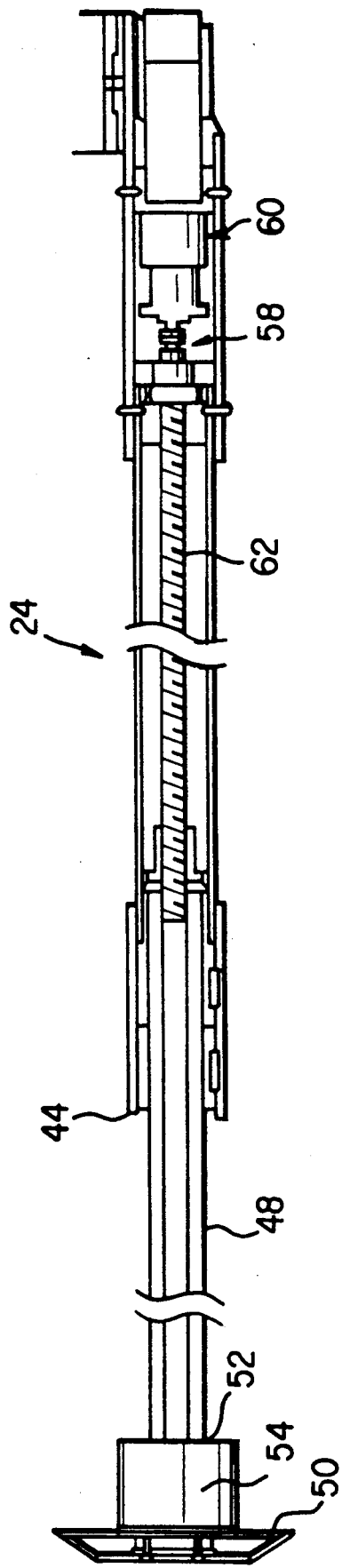
FIG. 4 is a cross-sectional view of a pedestal.

Preferably, each of the pedestals 24 have an extension 48 disposed in the pedestal 24 which can extend downward from the pedestal 24 as shown in FIG. 4. There is also means for extending the extension 48 from the pedestal 24, and a foot 50 connected to the bottom 52 of the extension 48. The foot 50 is connected such that the extension 48 can rotate in the θ direction about the foot 50 so the foot remains still on the terrain 12 when the extension 48 rotates about it.

Figure 5:
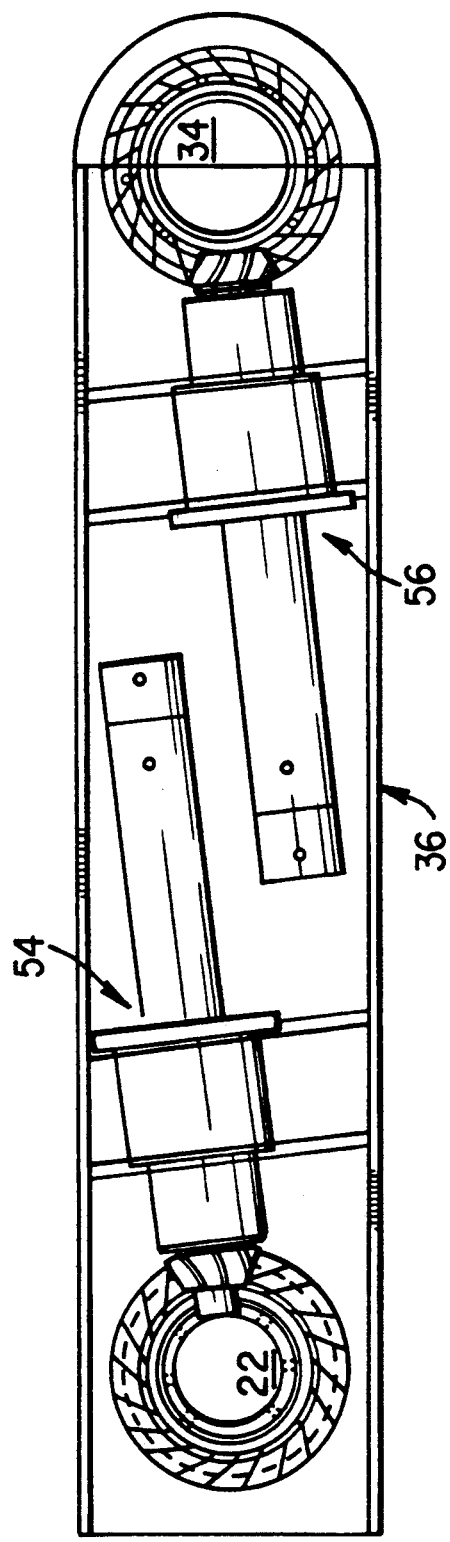
FIG. 5 is a cross-sectional plan view of the first linkage between the shoulder and the elbow.

The moving means preferably includes, in each first linkage 36 of each leg 18, a first drive train 54 connected to the shoulder 22 for rotating the shoulder 22, as shown in FIG. 5. The moving means also preferably includes a second drive train 56 connected to the elbow 34 for rotating the elbow 34. The extending means in each pedestal 24 is a third drive train 58 connected to the extension 48. The third drive train operates with the use of a motor 60 turning a screw 62. Depending on the direction of the screw 62, the extension 48 which is attached to the screw 62 is either drawn into the pedestal 24 or extended outward from the pedestal 24. The computer 20 is connected to each of the drive trains in each of the legs 18 to control movement thereof.

Figure 6C:
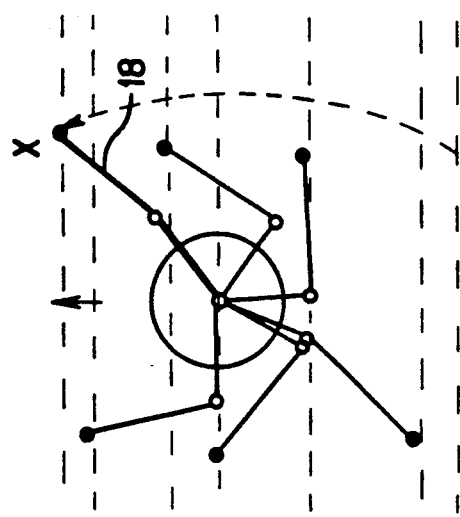
FIG. 6 A-C are overhead views of the robot in different positions as it walks.
Figure 6B:
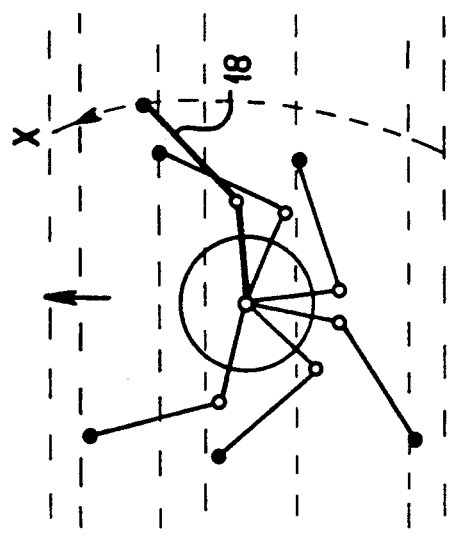
Figure 6A:
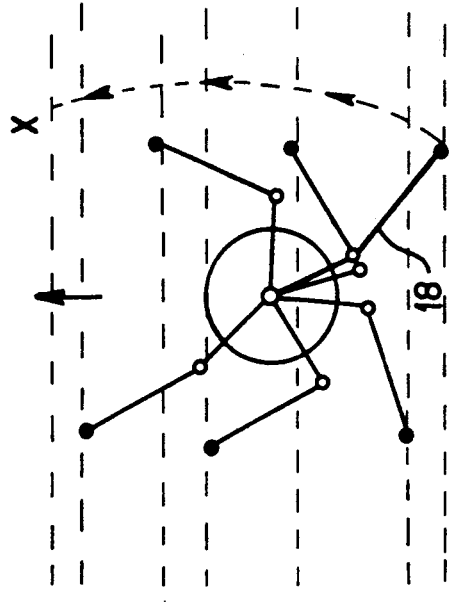

In the operation of the preferred embodiment, the body moves forward along a desired path by the movement of the legs 18. Referring to FIG. 6A, there is shown an overhead view of a robot 10. In order for the robot 10 to move in a desired direction of travel, identified by an emboldened arrow, the shoulders 22 and elbows 34 are controlled to give the desired body motion. As the body 14 progresses, legs 18 are replaced ahead of the body 14. The process, known as recovering, is shown in FIGS. 6A-C. While the body moves, a recovering leg 18 (shown in bold) is caused to move to a desired foot placement identified by an x in FIGS. 6A, B and C. The foot 50 of the recovering leg 18 is first lifted off the terrain by retracting the extension 48 in the pedestal 24, and then moved to the desired position by rotating the shoulder 22 and elbow 34. The feet 50 of the supporting (not recovering) legs 18 remain fixed in place while the shoulders 22 and elbows 34 of the supporting legs rotate to cause body 14 motion in the direction of travel.

The body 14 continues moving in the direction of travel as the recovering leg 18 approaches the desired foot placement, as shown in FIG. 6B and 6C, with the associated movement of the shoulders 22 and elbows 34 of the supporting legs 18. When the recovering leg 18 reaches its desired foot placement, as shown in FIG. 6C, the extension 48 of the pedestal 24 of the recovering leg 18 is extended to the proper length by the third drive train 58 disposed in the recovering leg 18 until the foot 50 is planted on the terrain 12. The above action is then repeated with a different recovering leg 18 and so on, until the desired destination is reached. At any time, the body can move up and down with respect to the z direction by operation of the third drive train in the legs 18.

As the shoulders 22 and elbows 34 of the supporting legs 18 rotate to cause the movement of the body 14, the extension 48 rotates but the foot 50 does not. This allows for the foot 50 to remain fixed in place on the terrain and allows the elbow 34 and shoulder 22 to rotate essentially unrestricted. This type of one-dimensional rotation connection between the foot 50 and the extension 48 is accomplished with a one-dimensional ball and socket joint 64 disposed at the end 52 of the extension 48 and in the foot 50, respectively.

Although the invention has been described in detail in the foregoing embodiments for the purpose of illustration, it is to be understood that such detail is solely for that purpose and that variations can be made therein by those skilled in the art without departing from the spirit and scope of the invention except a it may be described by the following claims.

What is claimed is;

1. A robot for moving along terrain comprising:
    a body;
    means for moving the body, said moving means including legs; each leg exhibiting an overlapping gait with respect to every other leg and comprised of a pedestal which has an axis that is disposed essentially in a z direction; and
    means for positioning the axis of the pedestal at a desired ground engaged location with respect to an r, $\theta$ plane, where r and $\theta$ are directions mutually orthogonal to each other and the z direction; said moving means also able to move the body in any of r, $\theta$ heading and z dimensions, said heading defined by a direction in which the movable body is pointing.

2. A robot as described in claim 1 wherein the positioning means includes a shoulder that is rotatable in the $\theta$ direction; and means for linking the shoulder and the pedestal such that the pedestal can be moved in the r direction to a desired r position with respect to the shoulder.

3. A robot as described in claim 2 wherein the linking means is linked to the pedestal at a position which is essentially maintained at the same height as the shoulder.

4. A robot as described in claim 3 wherein said linking means and said shoulder define a plane in the r and $\theta$ directions, and the linking means includes an elbow that is disposed between and connected to the shoulder and the pedestal such that the elbow is maintained in the r, $\theta$ plane, said elbow rotatable in the $\theta$ direction.

5. A robot as described in claim 4 wherein the linking means includes a first linkage disposed between and connected to the shoulder and the elbow such that when the shoulder rotates in the $\theta$ direction, the first linkage and the elbow sweep a corresponding arc length in the r, $\theta$ plane; and a second linkage disposed between and connected to the elbow and the pedestal such that when the elbow rotates in the $\theta$ direction, the second linkage and the pedestal sweep a corresponding arc length in the r, $\theta$ plane.

6. A robot as described in claim 5 wherein the body includes a member having an axis, said member extends upwards such that the axis of the member is essentially in the z direction; and wherein each shoulder has an axis and each axis of each shoulder of each leg is disposed on the axis of the member, said shoulders being stacked on top of each other; wherein each of said pedestals have a length that corresponds to the height of its respective shoulder stacked on the member such that all the pedestals have a bottom that together form a second r, $\theta$ plane; and wherein each of said pedestals have
    an extension disposed therein which can extend downward from the pedestal in the z direction;
    means for extending the extension; and
    a foot connected to the bottom of the extension such that the extension can rotate in the $\theta$ direction about the foot so the foot remains still on the terrain when the extension rotates about it.

7. A robot as described in claim 6 wherein the moving means includes, in each first linkage of each leg, a first drive train connected to the shoulder for rotating the shoulder; and second drive train connected to the elbow for rotating the elbow; and wherein the extending means in each pedestal is a third drive train connected to the extension.

8. A robot for moving along terrain comprising:
    a body having a member having an axis, said member extending in essentially a z direction from the body;
    means for moving the body, said moving means including legs;
    each leg comprised of a pedestal which has an axis that is disposed essentially in the z direction; and
    means for positioning the axis of the pedestal at a desired location with respect to an r, $\theta$ plane where r and $\theta$ are directions mutually orthogonal to each other; with the positioning means including a shoulder that is rotatable in the $\theta$ direction and means for linking the shoulder and the pedestal such that the pedestal can be moved in the r direction to a desired r position with respect to the shoulder, and wherein each shoulder has an axis and each axis of each shoulder of each leg is disposed on the axis of the member, each shoulder being stacked on top of each other; wherein each of said pedestals have a length that corresponds to the height of its respective shoulder stacked on the member such that all the pedestals have a bottom that together form a second r, $\theta$ plane.

9. A robot as described in claim 8 wherein the linking means is linked to the pedestal at a position which is essentially maintained at the same height as the shoulder.

10. A robot as described in claim 9 wherein said linking means and said shoulder define a plane in the r and $\theta$ directions, and the linking means includes an elbow that is disposed between and connected to the shoulder and the pedestal such that the elbow is maintained in the r, $\theta$ plane, said elbow rotatable in the $\theta$ direction.

11. A robot as described in claim 10 wherein the linking means includes a first linkage disposed between and connected to the shoulder and the elbow such that when the shoulder rotates in the $\theta$ direction, the first linkage and the elbow sweep a corresponding arc length in the r, $\theta$ plane; and a second linkage disposed between and connected to the elbow and the pedestal such that when the elbow rotates in the $\theta$ direction, the second linkage and the pedestal sweep a corresponding arc length in the r, $\theta$ plane.

12. A robot as described in claim 11 wherein each pedestal has:

an extension disposed therein which can extend downward from the pedestal in the z direction;
means for extending the extension; and
a foot connected to the bottom of the extension such that the extension can rotate in the $\theta$ direction about the foot so the foot remains still on the terrain when the extension rotates about it.

13. A robot as described in claim 12 wherein the moving means includes, in each first linkage of each leg, a first drive train connected to the shoulder for rotating the shoulder; and second drive train connected to the elbow for rotating the elbow; and wherein the extending means in each pedestal is a third drive train connected to the extension.

* * * * *